(12) United States Patent
Ibn-Elhaj et al.

(10) Patent No.: US 9,322,956 B2
(45) Date of Patent: Apr. 26, 2016

(54) PHOTO-ALIGNMENT LAYERS WITH STRONG UV-DICHROISM

(71) Applicant: ROLIC AG, Zug (CH)

(72) Inventors: Mohammed Ibn-Elhaj, Allschwil (CH); Eva Veenstra, Lorrach (DE); Manuel Koechlin, Basel (CH)

(73) Assignee: ROLIC AG, Zug (CH)

( * ) Notice: Subject to any disclaimer, the term of this patent is extended or adjusted under 35 U.S.C. 154(b) by 228 days.

(21) Appl. No.: 14/344,015

(22) PCT Filed: Sep. 28, 2012

(86) PCT No.: PCT/EP2012/004067
§ 371 (c)(1),
(2) Date: Mar. 10, 2014

(87) PCT Pub. No.: WO2013/050120
PCT Pub. Date: Apr. 11, 2013

(65) Prior Publication Data
US 2014/0226115 A1 Aug. 14, 2014

(30) Foreign Application Priority Data

Oct. 3, 2011 (EP) ..................................... 11183656

(51) Int. Cl.
*G02F 1/1337* (2006.01)
*G02B 1/04* (2006.01)

(52) U.S. Cl.
CPC ............ *G02B 1/04* (2013.01); *G02F 1/133711* (2013.01); *G02F 1/133788* (2013.01); *G02F 2001/133738* (2013.01); *G02F 2001/133749* (2013.01); *G02F 2201/086* (2013.01)

(58) Field of Classification Search
CPC .................... G02F 1/133711; G02F 1/133788; G02B 1/04
USPC .................. 349/123–125, 132, 141, 142, 144
See application file for complete search history.

(56) References Cited

U.S. PATENT DOCUMENTS

| | | | |
|---|---|---|---|
| 3,957,347 A * | 5/1976 | Saeva ...................... | G02F 1/137 349/163 |
| 4,122,027 A | 10/1978 | Cole et al. | |
| 4,401,369 A | 8/1983 | Jones | |
| 4,565,424 A | 1/1986 | Huffman et al. | |
| 4,667,020 A | 5/1987 | Etzbach et al. | |
| 5,389,285 A | 2/1995 | Shannon et al. | |
| 5,539,074 A | 7/1996 | Herr et al. | |
| 6,107,427 A | 8/2000 | Herr et al. | |
| 6,201,087 B1 | 3/2001 | Herr et al. | |
| 6,335,409 B1 | 1/2002 | Herr et al. | |

(Continued)

OTHER PUBLICATIONS

Adachi et al, "Flow-induced Alignment of Amyloid Protofilaments Revealed by Linear Dichroism", The Journal of Biological Chemistry vol. 282, No. 12, pp. 8978-8983, Mar. 23, 2007.*

(Continued)

*Primary Examiner* — Hoan C Nguyen
(74) *Attorney, Agent, or Firm* — Sughrue Mion, PLLC

(57) ABSTRACT

The invention relates to photo-alignment layers for planar alignment of liquid crystals. Photo-alignment layers according to the invention exhibit a characteristic wavelength dependency of the dichroism in the uv wavelength range. The invention further relates to methods for providing such photo-alignment layers as well as liquid crystal devices containing them.

13 Claims, 2 Drawing Sheets

(56) References Cited

U.S. PATENT DOCUMENTS 6,632,909 B2    10/2003   Buchecker et al.
2006/0082719 A1*  4/2006   Okabe ............... C09K 19/0225
                                                    349/172
2013/0258266 A1* 10/2013   Sukhomlinova ..... C09K 19/601
                                                    349/179

OTHER PUBLICATIONS

Schadt Martin et. Al, "Photo-Generation of linearly polymerized liquid crystal aligning layers comprising novel, integrated optically patterned retarders and color filters", Japanese Journal of Applied Physics, Jun. 1995, pp. 3240-3249, vol. 34, No. 6A.

Jesper Osterman et al, "40.3: Anchoring Energy Control and Bistable Surface Switching Based on Photo-Alignment Technology", 2004 SID International Symposium, Seattle, WA, pp. 1208-1211.

Kawatsuki Nobuhiro et al., "Photoinduced cooperation reorientation in polymer blend films with hydrogen-bonded mesogenic side groups", Reactive & Functional Polymers, 2009, pp. 836-842, vol. 69.

International Search Report of PCT/EP2012/004067 dated Jan. 21, 2013.

\* cited by examiner

PHOTO-ALIGNMENT LAYERS WITH STRONG UV-DICHROISM

CROSS REFERENCE TO RELATED APPLICATIONS

This is a National Stage of International Application No. PCT/EP2012/004067 filed Sep. 28, 2012, claiming priority based on European Patent Application No. 11183656.5 filed Oct. 3, 2011, the contents of all of which are incorporated herein by reference in their entirety.

TECHNICAL FIELD

The invention relates to photo-alignment layers exhibiting a characteristic wavelength dependency of the dichroism in the uv wavelength range. The invention further relates to methods for providing such photo-alignment layers as well as liquid crystal devices containing them.

BACKGROUND OF THE INVENTION

Nowadays liquid crystal displays (LCDs) are commercially used in almost any area, where information is displayed electronically. High resolution LCDs are for example used in television screens, computer monitors, laptops, tablet PCs, smart phones, mobile phones and digital cameras. Although size and applications are quite different, all of these LCDs are video capable and require high speed switching and high contrast ratio. In order to realize high contrast, it is most important to provide a very low dark state brightness. In "normally white" LCD modes, like a standard TN-LCD, the dark state is achieved by applying a voltage to the LCD. Consequently, the light transmission in the dark state can be controlled by the applied voltage. In case of "normally black" mode LCDs, such as the vertical alignment (VA) mode, in-plane switching (IPS) or fringe field switching (FFS), the dark state corresponds to the non-activated state and therefore the dark state brightness cannot be adjusted by a voltage. Consequently, the dark state mainly depends on the quality of the liquid crystal alignment in the LCD. For VA-mode LCDs the low dark state brightness is achieved if all of the liquid crystal molecules are aligned almost perpendicular to the LCD surface, as then a viewer looking from a direction perpendicular to the screen looks along the optical axis direction of the liquid crystal molecules, in which the liquid crystals do not exhibit birefringence.

In case of planar modes, such as IPS and FFS, the liquid crystal director in the dark state is oriented parallel or perpendicular to the polarization directions of the attached, normally crossed polarization films. Liquid crystal domains, which are not perfectly aligned in the desired direction, introduce birefringence, which causes light leakage due to depolarization of the light. Hence, well defined azimuthal anchoring of the liquid crystals on the alignment layers is crucial to guarantee low dark state brightness for planar mode LCDs, in particular when operated in the normally black mode.

When applying a voltage to an LCD to switch it to a grey or bright state, the liquid crystal layer is deformed and again the alignment layer has to provide strong anchoring forces for the liquid crystals in order to drive them back to the initial off-state configuration, as soon as the applied voltage is below the threshold voltage of the LCD. Any deviation to the initial off-state configuration will be observed as image sticking and therefore display quality is reduced. Because an alternate current (AC) voltage is applied to switch the LCD to different grey levels, the image sticking, which occurs after the AC-voltage is changed or removed is also referred to as AC-memory.

Conventionally, alignment of the liquid crystals in LCD production has been done by brushing a thin polymer layer on the LCD substrates with a cloth. As this process becomes more and more challenging because of the increasing size of the motherglass, there is strong demand for alternative alignment methods.

The most promising approach for replacing the brushing process is photo-alignment. Contrary to brushing, photo-alignment avoids mechanical contact with the surface of the alignment layer. As a consequence, photo-alignment does not create mechanical defects, and hence it offers a very high yield in production.

Photo-alignment has been successfully introduced into mass production of VA-LCDs a few years ago and is now an established technology for LCD alignment. On the other hand, despite the strong demand from LCD manufacturers for photo-alignment of planar mode LCDs, it has not been introduced in the production of such LCDs so far. The reason is that photo-alignment materials have so far not satisfied the challenging alignment quality requirements of planar mode LCDs in terms of display contrast and image sticking.

It is therefore an object of the invention to provide new photo-aligning materials and photo-alignment layers with high anchoring, for planar LCD modes, which enable high contrast LCDs with reduced AC-memory.

SUMMARY OF THE INVENTION

According to a first aspect of the invention, there is provided a photo-alignment layer for planar alignment of liquid crystals. The photo-alignment layer is optically anisotropic and has a negative dichroism with $\Delta A<-0.3$ per micrometer thickness in at least one wavelength range above 230 nm and a positive dichroism with $\Delta A>0.07$ per micrometer thickness in at least one wavelength range between 190 nm and 230 nm.

Preferably, $\Delta A$ is less than $-0.4$ per micrometer thickness in at least one wavelength range above 230 nm and $\Delta A$ is larger than 0.15 per micrometer thickness in at least one wavelength range between 190 nm and 230 nm. Even more preferred is that $\Delta A$ is less than $-0.5$ per micrometer thickness in at least one wavelength range above 230 nm and $\Delta A$ is larger than 0.2 per micrometer thickness in at least one wavelength range between 190 nm and 230 nm. Most preferred is that $\Delta A$ is less than $-0.7$ per micrometer thickness in at least one wavelength range above 230 nm and $\Delta A$ is larger than 0.3 per micrometer thickness in at least one wavelength range between 190 nm and 230 nm.

The dichroism in the at least two wavelength ranges is created by exposure of the photo-aligning material to aligning light.

The term optically anisotropic, as used in this application, refers to optical parameters in general, for example to light absorption or refractive index, whereas one or more of such optical properties may be anisotropic. Anisotropy may exist anywhere in the wavelength range covering uv-, visible and infrared light. In the context of the present invention, aligning light is light of wavelengths, which can initiate photo-alignment. Preferably, the wavelengths are in the UV-A, UVB and/or UV/C-range or in the visible range. It depends on the photo-alignment material, which wavelengths are appropriate.

The aligning light is linearly or elliptically polarized, whereas the term polarized shall also include partially polarized light. Preferably, the aligning light is linearly polarized with a degree of polarization of more than 10:1.

The term pretilt angle as used in the context of the present invention is the angle between the liquid crystal director and the surface of the alignment layer in the absence of any external forces, such as electric or magnetic fields. The liquid crystal director shall mean the average direction of the long axes of the liquid crystal molecules. In the context of the present invention, planar alignment shall mean that the pretilt angle is less than 30°.

The pretilt angle induced in a liquid crystal material by an alignment layer does not only depend on alignment layer properties but also on the nature of the liquid crystal material. Accordingly, there may be liquid crystal materials which do not align planar when in contact with a photo-alignment layer of the invention. However, this does not exclude such photo-alignment layers from applications with planar alignment, as long as there are suitable liquid crystals, in which planar alignment can be achieved.

Therefore, the following preferences regarding the pretilt angle ranges shall not mean that such pretilt angle is induced in any liquid crystal material, but shall mean that there are liquid crystal materials, in which a pretilt angle within the corresponding range can be induced.

Preferably, the photo-alignment layer can induce a pretilt angle in a suitable liquid crystal material, which is less than 10°. More preferred is, that the photo-alignment layer can induce a pretilt angle in a suitable liquid crystal material, which is less than 5° and most preferred is that the photo-alignment layer can induce a pretilt angle in a suitable liquid crystal material, which is less than 1°.

Aligning light direction shall mean the intersection line of the alignment layer surface and the plane of polarization of the aligning light during the exposure. If the aligning light is elliptically polarized, the plane of polarization shall mean the plane defined by the incident direction of the light and by the major axis of the polarization ellipse.

The term aligning light direction is used in the context of the preset invention not only to describe a direction for the duration of the exposure process, but also after exposure to refer to the direction of the aligning light on the alignment layer as it was applied during exposure.

In the context of the present invention the dichroism $\Delta A(\lambda)$ is defined as the difference of the absorbance $Ap(\lambda)$, measured along the aligning light direction and the absorbance $As(\lambda)$, measured perpendicular to the aligning light direction, wherein $\lambda$ is the wavelength of light.

A positive dichroism at a certain wavelength shall mean that $\Delta A>0$ at this wavelength, whereas a negative dichroism shall mean that $\Delta A<0$.

The term photo-alignment layer shall mean an alignment layer, which has been obtained by exposing a photo-alignable material to aligning light. A photo-aligning material may be any kind of photo-sensitive material which can be aligned by exposure to aligning light independent from the photo-reaction mechanism. Therefore, suitable photo-aligning materials are, for example, materials in which upon exposure to aligning light the alignment is induced by photo-dimerization, photo-decomposition, cis-trans isomerisation or photo-Fries rearrangement. Accordingly, preferred photo-alignment layers according to the invention are those, in which the dichroism is caused by photo-dimerization, photo-decomposition, cis-trans isomerisation or photo-Fries rearrangement.

According to a second aspect of the invention, there is provided a method for the generation of a photo-alignment layer, exhibiting the dichroism properties according to the invention. The method comprises the preparation of a layer of a proper photo-aligning material on a substrate and exposing the layer to aligning light. The photo-aligning material is so selected that upon exposure to the aligning light a photo-alignment layer results with the characteristic dichroism properties according to the invention.

According to a third aspect of the invention, there is provided a liquid crystal display device with planar alignment of the liquid crystals, incorporating at least one photo-alignment layer as described above. Because of the strong anchoring energy provided by photo-alignment layers according to the invention, such LCDs exhibit high contrast and low AC-memory. According to the invention, the pretilt angle induced by the photo-alignment layer in the liquid crystal material of the LCD is less than 30°. Preferably, the pretilt angle induced by the photo-alignment layer in the liquid crystal material of the LCD is less than 10°. More preferred are LCDs, wherein the pretilt angle induced by the photo-alignment layer in the liquid crystal material is less than 5° and most preferred are LCDs, wherein the pretilt angle induced by the photo-alignment layer in the liquid crystal material is less than 1°.

LCDs according to the invention may use any kind of display mode with planar alignment, such as twisted nematic (TN), IPS or FFS. Preferably, the electrodes in the LCD are such that upon applying a voltage to the electrodes, an electric field develops, which at certain positions within the liquid crystal layer is parallel to the surface of the alignment layer. To achieve this, the voltage is typically provided to electrodes on only one of the two substrates. For this purpose interdigital electrodes can be used, for example in a comb-like form. In particular preferred are LCDs using the IPS or FFS mode.

BRIEF DESCRIPTION OF THE DRAWINGS

FIG. 2 corresponds to FIG. 4*a* of Schadt et. al, Jpn. J. Appl. Phys, Vol. 34 (1995), 3240

DETAILED DESCRIPTION OF THE INVENTION

Figure 1:
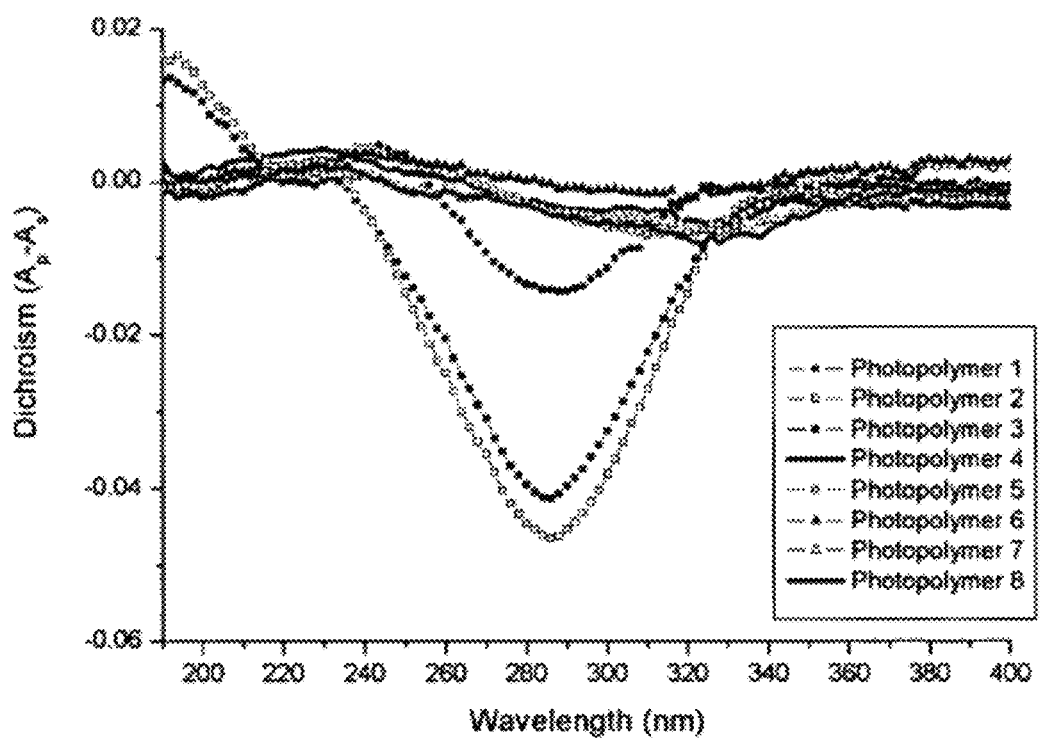
FIG. 1 shows measurements of the dichroism of photo-aligned layers prepared from different photo-polymers.

Photo-alignable materials according to the invention incorporate photo-alignable moieties, which are capable of developing a preferred direction upon exposure to aligning light and thus inducing an alignment capability for liquid crystals.

Photo-alignable moieties preferably have anisotropic absorption properties and preferably exhibit absorption within the wavelength range from 230 to 500 nm.

Preferably the photo-alignable moieties have carbon-carbon, carbon-nitrogen, or nitrogen-nitrogen double bonds.

For example, photo-alignable moieties are substituted or un-substituted azo dyes, anthraquinone, coumarin, mericyanine, methane, 2-phenylazothiazole, 2-phenylazobenzthiazole, stilbene, cyanostilbene, chalcone, cinnamate, stilbazolium, 1,4-bis(2-phenylethylenyl)benzene, 4,4'-bis(arylazo) stilbenes, perylene, 4,8-diamino-1,5-naphthoquinone dyes, diaryl ketones, having a ketone moiety or ketone derivative in conjugation with two aromatic rings, such as for example substituted benzophenones, benzophenone imines, phenylhydrazones, and semicarbazones.

Preparation of the anisotropically absorbing materials listed above are well known as shown, e.g. by Hoffman et al., U.S. Pat. No. 4,565,424, Jones et al., in U.S. Pat. No. 4,401, 369, Cole, Jr. et al., in U.S. Pat. No. 4,122,027, Etzbach et al., in U.S. Pat. No. 4,667,020, and Shannon et al., in U.S. Pat. No. 5,389,285.

Preferably, the photo-alignable moieties comprise arylazo, poly(arylazo), stilbene and diaryl ketone derivatives and cinnamates, more preferred, the photo-alignable moieties comprise a cinnamate.

A photo-alignment material may have the form of a monomer, oligomer or polymer. The photo-alignable moieties can be covalently bonded within the main chain or within a side chain of a polymer or oligomer or they may be part of a monomer.

Polymers denotes for example to polyacrylate, polymethacrylate, polyimide, polyamic acids, polymaleinimide, poly-2-chloroacrylate, poly-2-phenylacrylate; unsubstituted or with $C_1$-$C_6$alkyl substituted poylacrylamide, polymethacyrlamide, poly-2-chloroacrylamide, poly-2-phenylacrylamide, polyvinylether, polyvinylester, polystyrene-derivatives, polysiloxane, staright-chain or branched alkyl esters of polyacrylic or polymethacrylic acids; polyphenoxyalkylacrylates, polyphenoxyalkylmethacrylates, polyphenylalkylmathacrylates, with alkyl residues of 1-20 carbon atoms; polyacrylnitril, polymethacrylnitril, polystyrene, poly-4-methylstyrene or mixtures thereof.

Further, preferred photo-alignable monomers or oligomers or polymers are described in U.S. Pat. No. 5,539,074, U.S. Pat. No. 6,201,087, U.S. Pat. No. 6,107,427, U.S. Pat. No. 6,335,409 and U.S. Pat. No. 6,632,909.

It has been found that photo-alignment layers having the properties of claim 1 provide strong anchoring for liquid crystals, which leads to high contrast and low AC-memory when applied in LCDs. Suitable photo-alignable materials for photo-alignment layers according to the invention are for example photopolymers 1, 2, 10, 11 and 12:

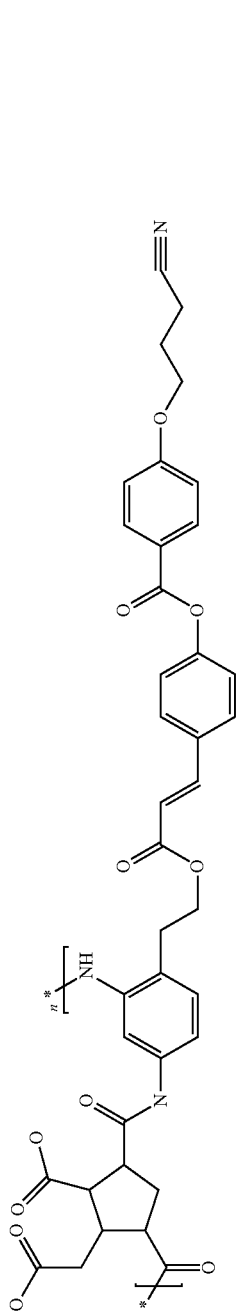
Photoplymer 1
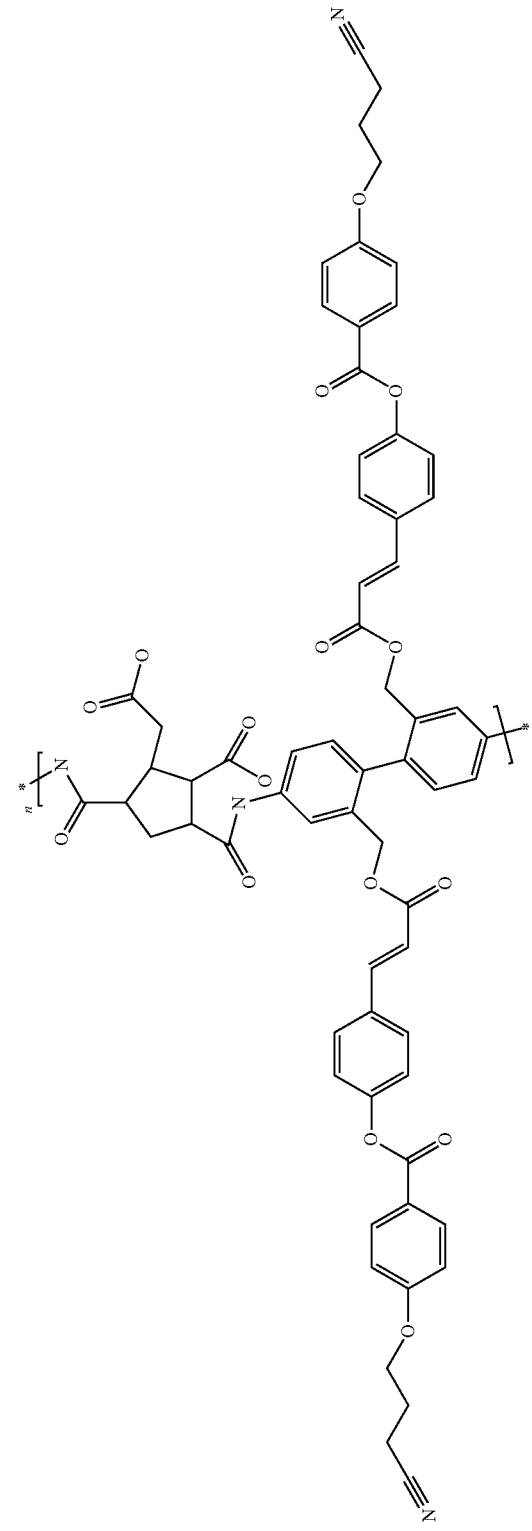
Photopolymer 2

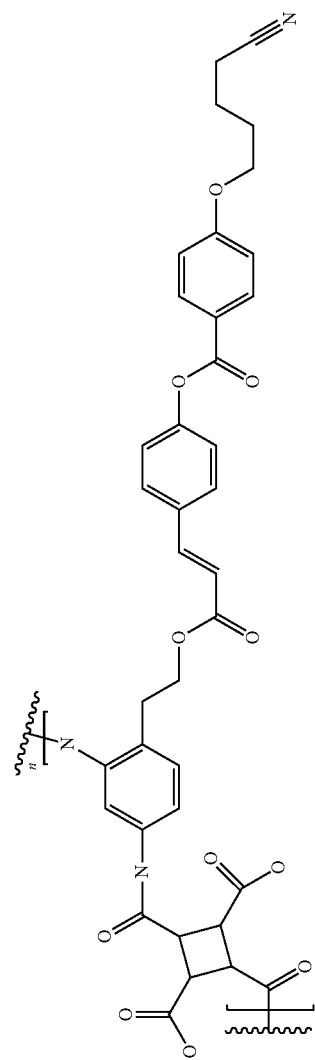
Photopolymer 10
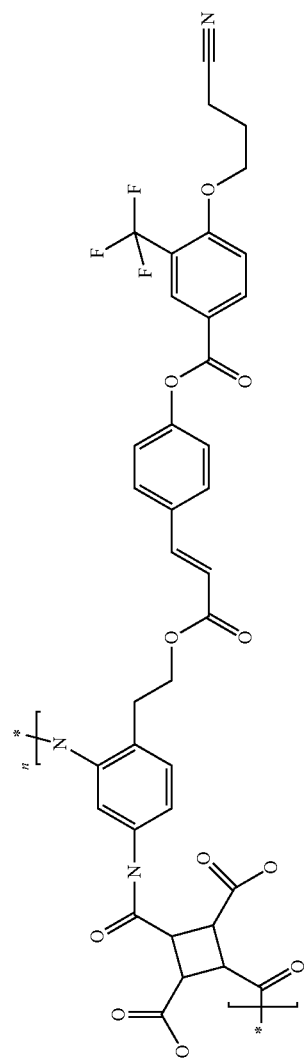
Photopolymer 11
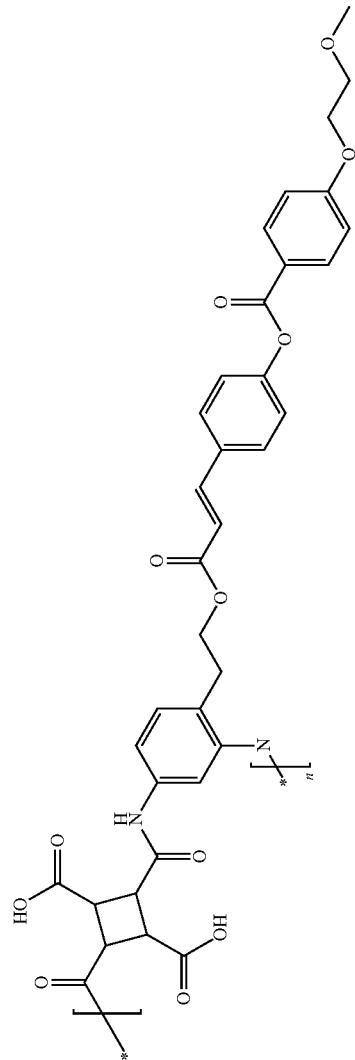
Photopolymer 12

Example 1

Measurement of the Dichroism of a Photo-Alignment Layer Made from Photopolymer 1

A solution S1 comprising 4.0% by weight photopolymer 1 in a 1:1 by weight solvent mixture of NMP and butyl cellosolve was prepared by first dissolving the solid photopolymer in NMP and stirring the solution until the solid polymer was completely dissolved. Then butyl cellosolve was added and the whole composition was stirred again to obtain the final solution.

The above solution of photopolymer 1 was spin-coated onto a fused silica substrate at a spin speed of 1700 rpm for 30 seconds. The coated substrate was subsequently baked for 40 minutes at 200° C. to form a thin polymer layer with a thickness of about 70 nm.

The photopolymer layer was then exposed to aligning light, which was linearly polarized light from a high pressure mercury lamp in the wavelength range from 280 to 340 nm. The aligning light was incident vertical (0°) to the substrate. The exposure dose was 200 mJ/cm$^2$.

UV absorptions $Ap(\lambda)$ and $As(\lambda)$ were measured in the wavelength range from 190 nm to 400 nm with the light polarized parallel and perpendicular to the aligning light direction, respectively, using a Perkin Elmer spectrometer (Lambda 900). The dichroism calculated as $A(\lambda)=Ap(\lambda)-As(\lambda)$ is depicted in FIG. 1.

The dichroism is negative in the wavelength range from about 240 nm to 340 nm with the lowest value of around −0.04 at about 285 nm, which corresponds to about −0.57 per micrometer thickness. Between 190 nm and 220 nm the dichroism is positive with a maximum value of about 0.013 at 190 nm, which corresponds to about 0.18 per micrometer thickness.

Example 2

Measurement of the Dichroism of a Photo-Alignment Layer from Photopolymer 2

A solution S2 comprising 4.0% by weight photopolymer 2 in a 1:1 by weight solvent mixture of NMP and butyl cellosolve was prepared in the same way as described in example 1. Subsequently a 70 nm thin layer of photopolymer 2 was prepared on a fused silica substrate, which was further exposed to aligning light using the same parameters as described in example 1.

The dichroism of an exposed layer of photopolymer 2, calculated from the measurements of $Ap(\lambda)$ and $As(\lambda)$, is also depicted in FIG. 1.

The dichroism is negative in the wavelength range from about 240 nm to 340 nm with the lowest value of around −0.042 at a wavelength of about 285 nm, which corresponds to about −0.6 per micrometer thickness. Between 190 nm and 220 nm the dichroism is positive with a maximum value of about 0.018 at a wavelength of 190 nm, which corresponds to about 0.26 per micrometer thickness.

Example 3

Liquid Crystal Cell with an Alignment Layer made from Photopolymer 1

Layers of photopolymer 1 were prepared on two ITO coated glass substrates following the procedure described in example 1. The resulting polymer layers were exposed to the aligning light of example 1 at a dose of 20 mJ/cm$^2$. The aligning light was vertically incident onto the substrates.

Using the two substrates, a liquid crystal cell was assembled with the exposed polymer layers facing each other inside of the cell. The substrates were adjusted relative to each other such that the corresponding aligning light directions were parallel to each other. The cell was capillary filled with liquid crystal MLC3005 (Merck KGA), which had a positive dielectric anisotropy. The liquid crystal in the cell showed well defined and homogeneous planar orientation. With the help of a tilting compensator it was determined that the liquid crystal in the cell aligned perpendicular to the aligning light direction. A pretilt angle of 0.1° was measured with Optipro 21-250A from Shintech, using the rotating analyzer method.

Example 4

Liquid Crystal Cell with an Obliquely Exposed Photo-Alignment Layer

A liquid crystal cell was prepared as in example 3, with the only difference that the aligning light was incident at an oblique angle of 40° relative to the normal of the substrates. The plane of polarization was within the incident plane of the aligning light.

The liquid crystal in the cell showed well defined and homogeneous planar orientation and was found to be aligned perpendicular to the aligning light direction. A pretilt angle of 0.03° was measured using the rotating analyzer method.

Example 5

Liquid Crystal Cell with an Alignment Layer made from Photopolymer 2

A liquid crystal cell was prepared following the procedure of example 3, but using solution S2 of example 2 instead of S1 and using an exposure dose of the aligning light of 100 mJ/cm$^2$.

The liquid crystal in the cell showed well defined and homogeneous planar orientation and was found to be aligned perpendicular to the aligning light direction. A pretilt angle of 0.2° was measured using the rotating analyzer method.

Example 6

Contrast Ratio in IPS Cells

LC cells were prepared starting from polymer solutions S1 (cell 1) and S2 (cell 2) as described in examples 3 and 5, respectively, with the difference that only one of the two substrates of each cell had an ITO layer. This ITO layer was patterned and formed comb-like interdigital electrodes with 10 micron wide stripes, which were separated from each other by 10 micron. For the exposure of the photopolymer layers the aligning light direction was chosen to be 78° relative to the electrode stripe direction. The exposure dose was 100 mJ/cm$^2$ in each case. The aligning light was vertically incident for cell 1 and incident at an oblique angle of 40° relative to the normal of the substrates for cell 2.

After capillary filling the cells with liquid crystal MLC3005 the cells were heated to 92° C. for 10 minutes and cooled down to room temperature again. The liquid crystal in the cell showed well defined and homogeneous planar orientation.

For the measurement of the contrast ratio of the cells, the cells were arranged between crossed polarizers such that the respective aligning light directions of the photo-alignment layers in the cells were parallel to the polarization direction of one of the polarizers. The transmission of white light was measured for the dark and the bright states of the cells. As long as no voltage was applied to the cells, they appeared dark. Upon applying a voltage to the interdigital electrodes the intensity of the transmitted light increased. The voltage was adjusted for maximum transmission of the cell, which was defined as the bright state. The contrast ratio was calculated as the ratio of transmitted light intensities of the bright state to that of the dark state.

The contrast ratio determined for cell 1 was 1800:1, whereas a value of 1900:1 was determined for cell 2.

Example 7

ACM properties of the Alignment Layers

Cells 1 and 2 of example 6 were used to determine the ACM image sticking properties of photo-alignment layers made from photopolymers 1 and 2.

The cells were arranged as for contrast ratio measurement in example 6, with the difference that a defined wavelength of 589 nm was used. The voltage V0 at which the cell transmitted 1% of its maximum transmission (T1) was determined. Image sticking was induced by applying a stress voltage V1 for 24 hours to the cell. The transmission of the cell at the voltage V0 was measured again (T1') and ACM was calculated as follows: ACM(t)=T1'(t)/T1×100%, where t denotes the time dependence of the measurement. In our measurements ACM(2 min) was determined. The voltage V1 was 7.15 V at which the cell exhibited its maximum transmission. ACM(2 min) determined for cells 1 and 2 were 116% and 117%, respectively.

Example 8

Dichroism of Photo-Alignment Layers Made from Photopolymers 10 to 12

Solutions S10 to S12 were prepared from photopolymers 10 to 12, respectively, in the same way as described for photopolymer 1 in example 1. Polymer layers with a thickness of about 70 nm were prepared on fused silica substrates using above solutions and subsequently the layers were exposed to aligning light using the same parameters as described in example 1.

The dichroism $\Delta A(\lambda)$ of each of the layers was determined as described in example 1. For each of the layers there is a negative dichroism in at least one wavelength range above 230 nm and a positive dichroism in at least one wavelength range between 190 nm and 230 nm.

The values $\Delta A(max)$, which are the values of $\Delta A(\lambda)$ with the largest absolute value in each of the two wavelength ranges are listed below:

|  | $\Delta A(max)$ per micrometer thickness | |
|---|---|---|
|  | within 190-230 nm | above 230 nm |
| Photopolymer 10 | 0.32 | −0.72 |
| Photopolymer 11 | 0.29 | −0.55 |
| Photopolymer 12 | 0.38 | −0.79 |

Example 9

Contrast Ratio in IPS Cells Using Photopolymers 10 to 12

IPS cells (cells 10 to 12) were prepared for each of the photopolymers 10 to 12 according to the description of example 6, but using the corresponding solutions S10 to S12.

The contrast ratio of the cells was measured as described in example 6. The following values were obtained:

|  |  | Contrast ratio |
|---|---|---|
| Photopolymer 10 | Cell 10 | 2400:1 |
| Photopolymer 11 | Cell 11 | 2200:1 |
| Photopolymer 12 | Cell 12 | 1800:1 |

Example 10

Comparative Photopolymers

Photo-alignment layers obtained from the following comparative photopolymers 3 to 9 do not exhibit the dichroism properties required by claim 1 of the present invention. Photopolymer 9 is known from the state of the art.

Photopolymer 3
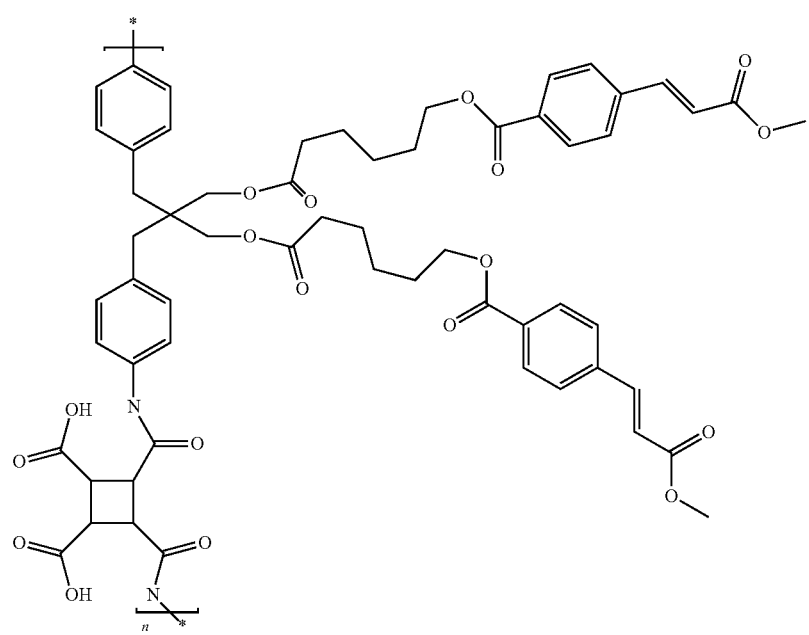
Photopolymer 4
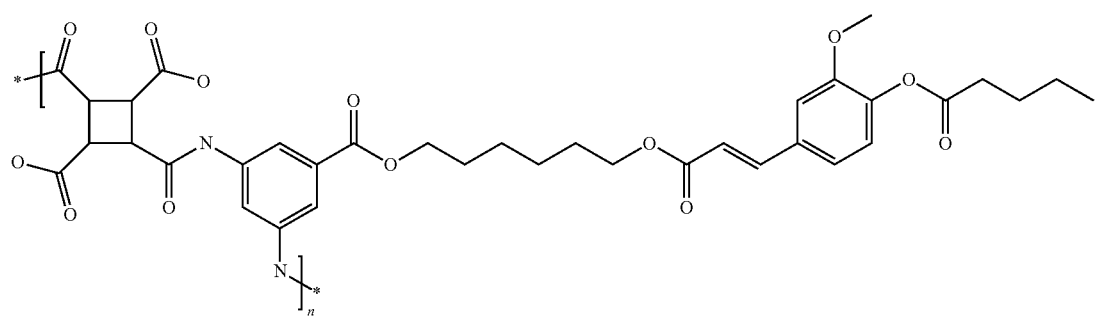
Photopolymer 5
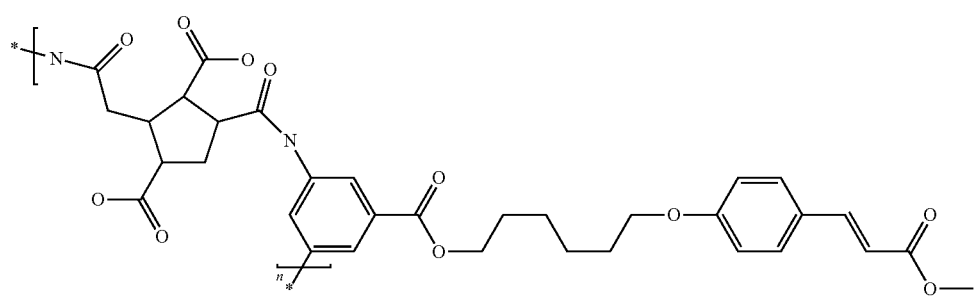
Photopolymer 6
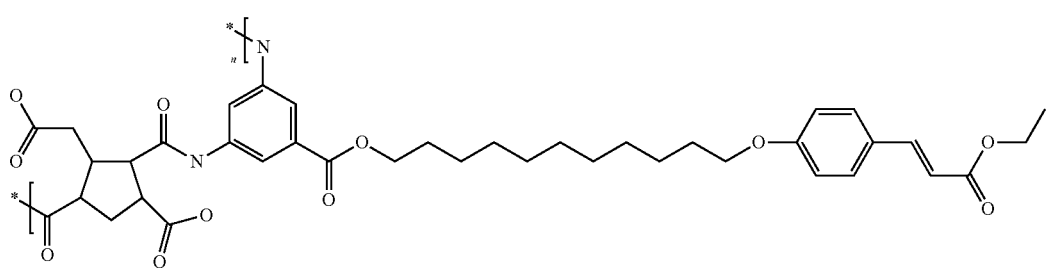

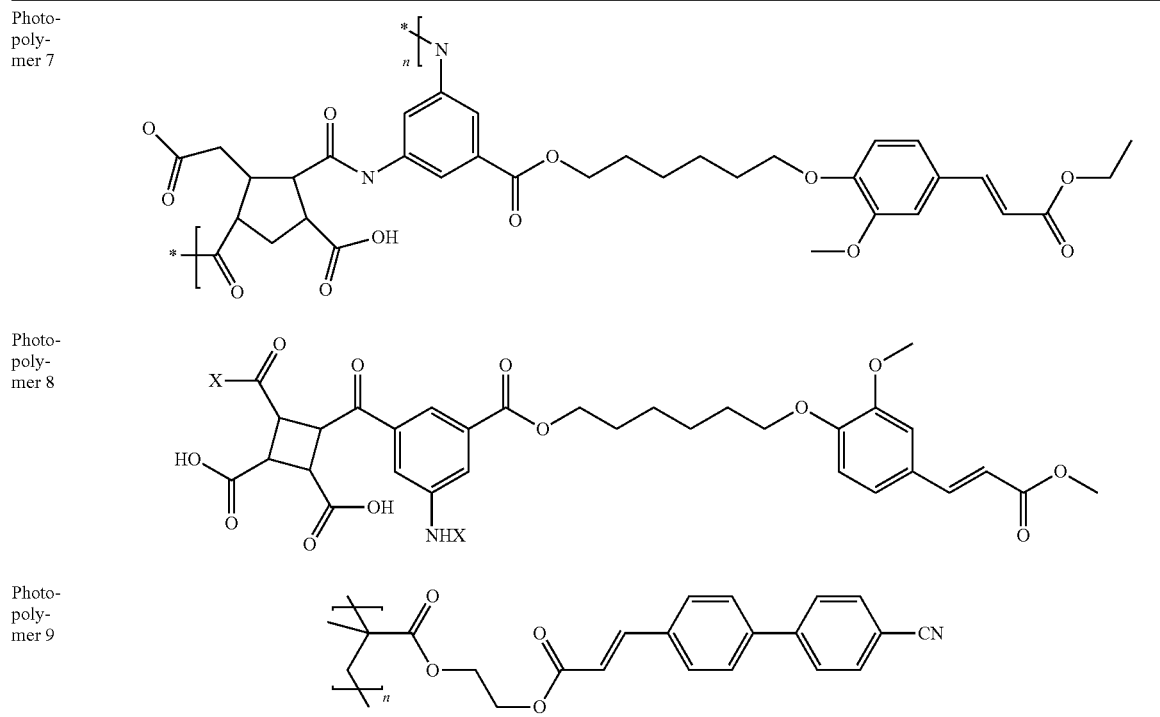

| | |
|---|---|
| Photopolymer 7 | |
| Photopolymer 8 | |
| Photopolymer 9 | |

Example 11

Dichroism of Layers of Comparative Photopolymers 3 to 8

Solutions S3 to S8 were prepared from photopolymers 3 to 8, respectively, in the same way as described for photopolymer 1 in example 1. Polymer layers with a thickness of about 70 nm were prepared on fused silica substrates using above solutions and subsequently the layers were exposed to aligning light using the same parameters as described in example 1.

The dichroism of each of the layers was determined as described in example 1 and depicted in FIG. 1. For each of the layers there is a negative dichroism in at least one wavelength range above 230 nm, however, the absolute value of the dichroism is less than 0.02 in each case, which is less than 0.3 per micrometer thickness. Below 230 nm the dichroism is smaller than 0.005 in each case, which is less than 0.07 per micrometer thickness.

Example 12

Dichroism of Aligned Layers of Comparative Photopolymer 9

Figure 2:
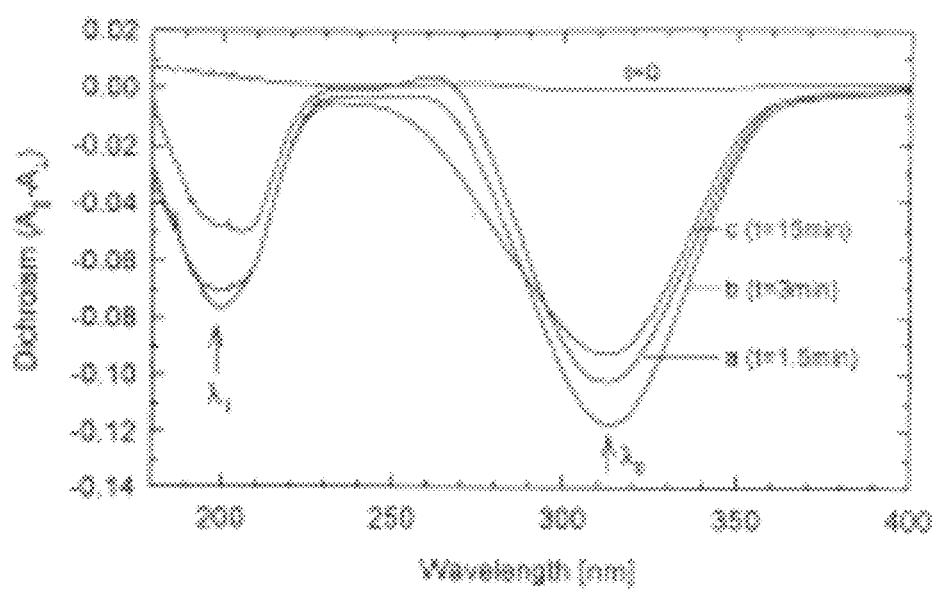
FIG. 2 shows the dichroism of a photoaligned layer of a state of the art photo-polymer.

Photopolymer 9 and the dichroism of photo-aligned layers of photopolymer 9 is known in the state of the art from Schadt et al. (Schadt. et. al, Jpn. J. Appl. Phys, Vol. 34 (1995), 3240). Contrary to claim 1 of the present invention in case of photopolymer 9, the dichroism in the wavelength range below 230 nm is negative, as shown in FIG. 2, which corresponds to FIG. 4a of Schadt et al.

Example 13

Contrast Ratio in IPS Cells Using Comparative Photopolymers 3 to 8

IPS cells (cells 3 to 8) were prepared for each of the photopolymers 3 to 8 according to the description of example 6, but using the corresponding solutions S3 to S8.

Directly after filling the liquid crystal in the cells all of the cells made using the comparative photopolymers showed alignment defects. After thermal treatment of the cells at 92° C. for 10 minutes the defects partly disappeared, but remained visible for some of the cells.

For each of the cells 3 to 8 the contrast ratio was less than 1400:1, which is not sufficient for LCD applications requiring very high contrast, such as, for example, LCD-TVs.

The liquid crystal in each of the cells 3 to 8 were aligned parallel to the aligning light direction.

The present invention should not be considered limited to the particular examples described above, but rather should be understood to cover all aspects of the invention as fairly set out in the claims. Various modifications, equivalent processes, as well as numerous structures to which the present invention may be applicable will be readily apparent to those of skill in the art to which the present invention is directed.

The invention claimed is:

1. A photo-alignment layer for planar alignment of liquid crystals, which is optically anisotropic and has a negative dichroism with $\Delta A < -0.3$ per micrometer thickness in at least one wavelength range above 230 nm and a positive dichroism with $\Delta A > 0.07$ per micrometer thickness in at least one wavelength range between 190 nm and 230 nm.

2. A photo-alignment layer according to claim 1, wherein $\Delta A < -0.5$ per micrometer thickness in at least one wavelength range above 230 nm and ΔA>0.2 per micrometer thickness in at least one wavelength range between 190 nm and 230 nm.

3. A photo-alignment layer according to claim 1, which is able to align a suitable liquid crystal material in contact with the surface of the alignment layer such the tilt angle of the liquid crystals is less than 10°.

4. A photo-alignment layer according to claim 3, which is able to align a suitable liquid crystal material in contact with the surface of the alignment layer such the tilt angle of the liquid crystals is less than 1°.

5. A photo-alignment layer according to claim 1, wherein the dichroism is caused by cis-trans isomerisation.

6. A photo-alignment layer according to claim 1, wherein the dichroism is caused by photo-dimerisation.

7. A photo-alignment layer according to claim 1, wherein the dichroism is caused by photo-decomposition.

8. A photo-alignment layer according to claim 1, wherein the dichroism is caused by photo-Fries rearrangement.

9. A liquid crystal display device comprising a photo-alignment layer according to claim 1.

10. A liquid crystal display device according to claim 9, wherein the pretilt angle in the liquid crystal material, which is induced by the photo-alignment layer, is less than 10°.

11. A liquid crystal display device according to claim 9, wherein the pretilt angle in the liquid crystal material, which is induced by the photo-alignment layer, is less than 1°.

12. A liquid crystal display device according to claim 9, wherein the electrodes are such that upon applying a voltage to the electrodes, an electric field develops, which at certain positions inside of the liquid crystal layer is parallel to the surface of the alignment layer.

13. A liquid crystal display device according to claim 9, which makes use of an IPS or FFS mode.

* * * * *